May 4, 1937.    M. V. GILSON    2,079,345
AUTOMOBILE TRUCK
Filed Oct. 9, 1935    3 Sheets-Sheet 2
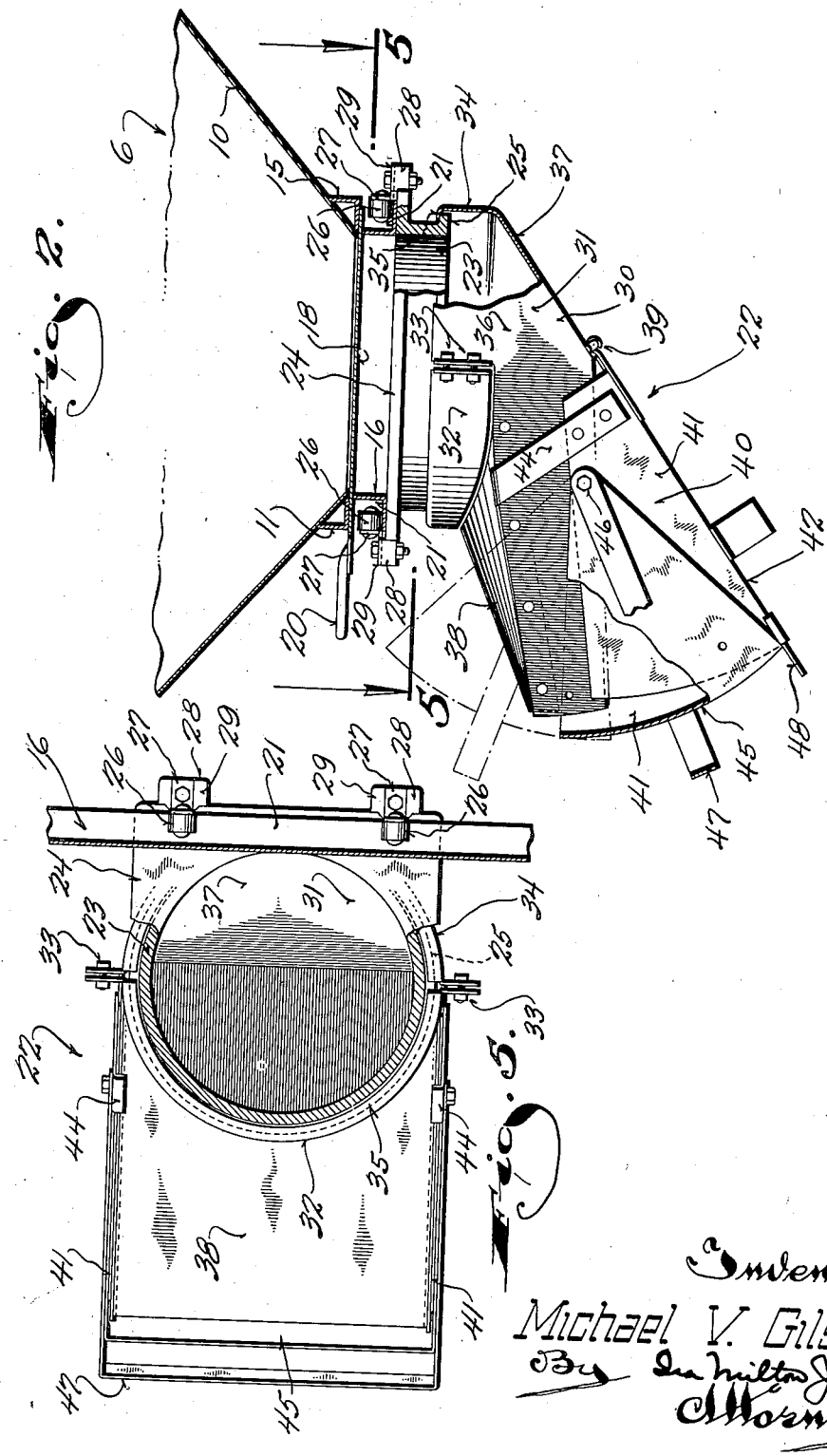
Inventor
Michael V. Gilson May 4, 1937. M. V. GILSON 2,079,345
AUTOMOBILE TRUCK
Filed Oct. 9, 1935 3 Sheets-Sheet 3
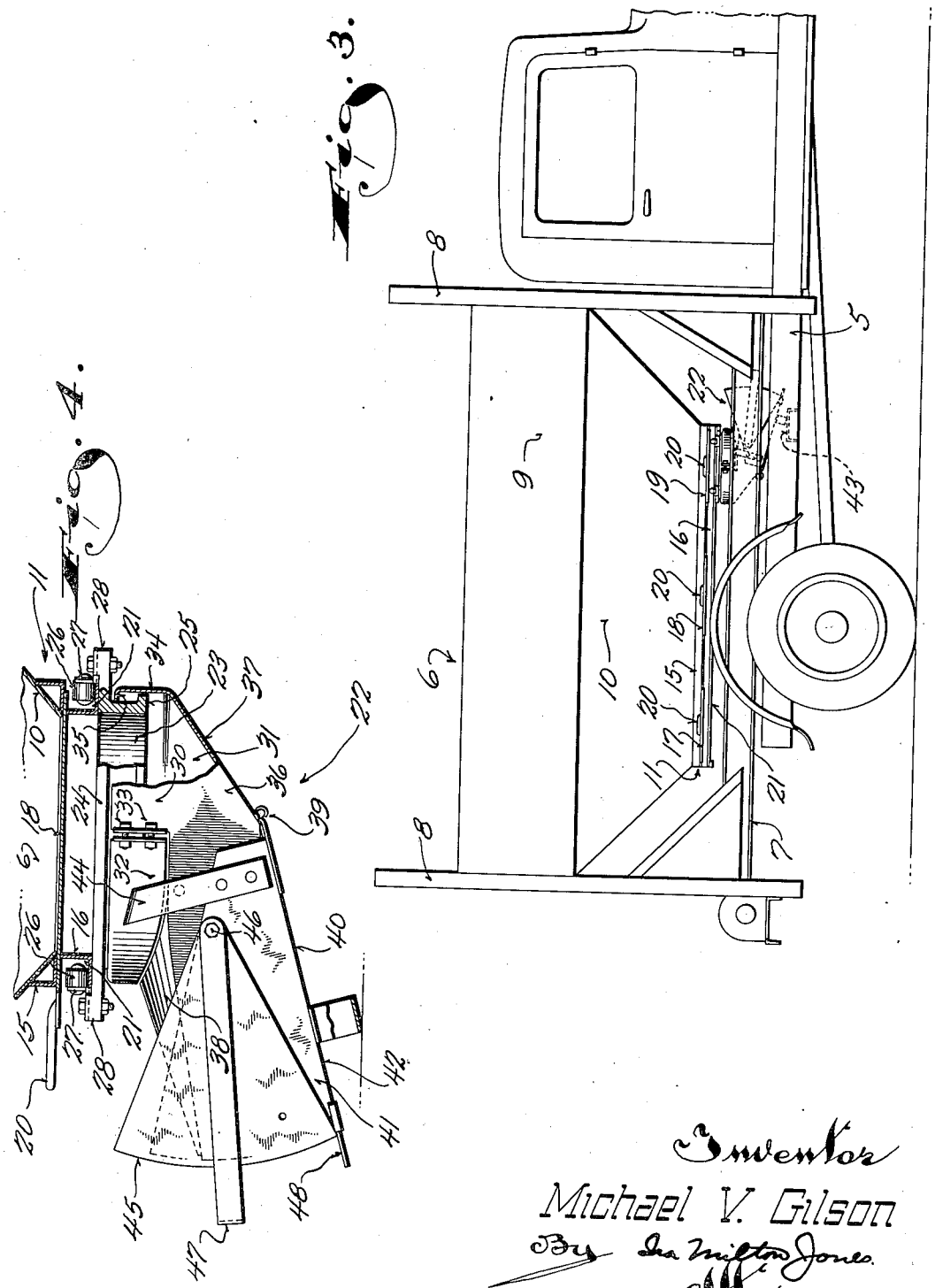
Inventor
Michael V. Gilson
By Ira Milton Jones.
Attorney Patented May 4, 1937

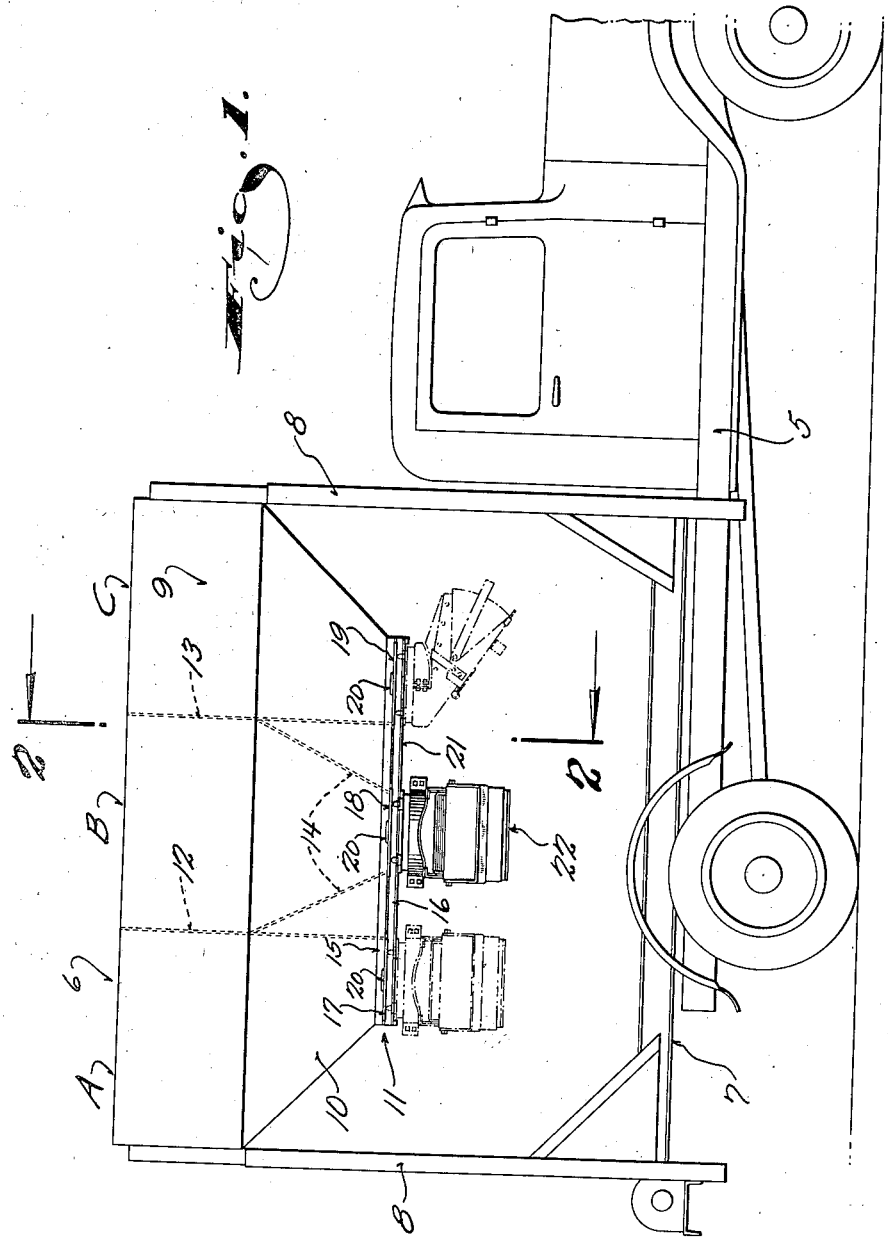

2,079,345

UNITED STATES PATENT OFFICE 2,079,345

AUTOMOBILE TRUCK

Michael V. Gilson, Fredonia, Wis., assignor to Gilson Brothers Company, Fredonia, Wis., a corporation of Wisconsin Application October 9, 1935, Serial No. 44,219

3 Claims. (Cl. 298—7)

This invention relates to automobile trucks and refers particularly to truck bodies of the type adapted to be bodily elevated for convenience in discharging their contents.

Truck bodies of this type and particularly those intended for the delivery of coal are generally provided with partitions to divide the same into separated compartments. Heretofore, to facilitate the discharge of the contents of the different compartments, the lower portion of the body tapered down to a single discharge opening substantially centrally located with respect to the several compartments and through which the contents of any selected compartment could be discharged. This resulted in a comparatively high body construction with the body portion of major dimensions at a substantial elevation above the truck chassis. As a consequence, the unit was top-heavy.

This obviously was objectionable, and the present invention therefore has as a general object to improve the construction of truck bodies of this character so as to eliminate the high construction and bring the center of gravity down lower.

With this broad general object in view, it is a further object of the present invention to provide a truck body of the character described in which the individual compartments have separate discharge ports and wherein a single discharge chute is readily movably carried by the body to be positionable beneath the discharge port of any selected compartment.

In keeping with the thought of maintaining the center of gravity low, it is a further object of the present invention to so construct the body and its discharge chute or spout that when the body is lowered to its normal traveling position, the discharge chute or spout is disposed thereunder and between the side rails of the truck chassis.

Another object of this invention is to provide a discharge chute or spout for a truck body of the character described which is so constructed as to fold automatically into a small space upon lowering of the truck body.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a side view of a coal truck showing its body raised to an unloading position;

Figure 2 is an enlarged section view taken through Figure 1 on the plane of the line 2—2;

Figure 3 is a side view of the truck with its body lowered to traveling position;

Figure 4 is a view similar to Figure 2 but showing the discharge chute or spout collapsed; and Figure 5 is a horizontal section view through Figure 2 on the plane of the line 5—5.

Referring now more particularly to the accompanying drawings, in which like numerals indicate like parts throughout the several views, the numeral 5 designates an automobile truck chassis of any conventional construction upon which a body 6 is mounted by means of a supporting framework 7. The framework 7 includes four uprights 8 which guide the body 6 for movement from an elevated unloading position shown in Figure 1 to a lowered traveling position shown in Figure 3 and vice versa.

The mechanism for raising and lowering the truck body 6 forms no part of this invention and has therefore not been shown.

The truck body 6 has a substantially rectangular upper portion 9 and a converging lower portion 10. The lower portion 10 terminates in a rectangularly shaped open bottom substantially narrower and shorter than the full horizontal cross sectional dimensions of the upper portion 9, and has a frame indicated generally by the numeral 11 fixed thereto about its lower edge.

The interior of the body 6 is divided into three compartments, A, B, and C, by means of partitions 12 and 13. The partitions 12 and 13 which define the inner walls of the end compartments A and C extend vertically down to the very bottom of the body and with the adjacent converging side walls and end walls of the lower portion 10 define the outlet ports for these end compartments A and C. The outlet port for the center compartment B is defined by the converging side walls of the lower portion 10 and inclined partitions 14 extending transversely across the lower portion 10 of the body with their upper edges contacting the partitions 12 and 13.

While this arrangement of the compartments in the body 6 has been found preferable, it is of course appreciated that the partitions may be arranged differently and the body divided into any number of compartments as the use to which the truck is put may require.

The frame 11 is built up of angle iron and is welded or otherwise fixed to the lower edge of the body 6. In the specific construction shown, this frame comprises two superimposed angle iron frames 15 and 16, the frame 15 being uppermost and being secured directly to the body 6 and the frame 16 being disposed therebeneath and spaced therefrom a slight distance by suitable spacers.

Slidable between the two frames 15 and 16 in line with the discharge ports of the compartments A, B, and C are gates or doors 17, 18 and 19 which respectively close the discharge ports A, B, and C. Handles 20 on these sliding gates or doors provide means for opening and closing the same.

The longitudinal side rails of the angle iron frame 16 provide spaced tracks 21 from which a discharge chute or spout, indicated generally by the numeral 22, is adjustably suspended. This discharge chute or spout 22 is arranged to travel longitudinally along the tracks 21 and to be disposed beneath the discharge port of any one of the compartments A, B, and C.

The discharge chute or spout comprises a cylindrical collar 23 having an outwardly directed square or rectangular flange 24 on its upper end and a cylindrical flange 25 projecting outwardly from its lower end. The internal diameter of the collar 23 is substantially equal to the distance between the longitudinal side rails of the lower angle iron frame 16 and is supported in sliding engagement with the lower portion thereof by rollers 26 riding on the tracks 21.

The rollers 26 are mounted on brackets 27 bolted to outwardly projecting ears 28 on the opposite sides of the rectangular flange 24. These ears 28 have portions 29 projecting up above the plane of the collar and into which the brackets 27 are countersunk, and the inner edges of these upwardly projecting portions 29 are so located as to slidably engage the outer edges of the tracks 21 and thus hold the collar 23 against revolution about its axis so as to maintain the rollers 26 in proper engagement with the tracks 21.

Freely rotatably supported from the lower flange 25 of the collar 23 is one section 30 of the discharge chute or spout. This section 30 is composed of two parts 31 and 32 bolted together as at 33. Together these two parts form a vertical neck 34 which embraces the lower end of the collar 23 and has an inwardly directed flange 35 to engage over the shoulder of the flange 25 and thus support the discharge chute or spout from the collar 23 in such a manner as to permit a degree of vertical collapsing and complete rotation of the chute or spout about the collar 23.

The part 31 of the chute section 30 has side walls 36 and a sloping bottom wall 37 both merging with its neck portion 34, and has a top wall 38 riveted to the side walls 36. At the lower edge of its sloping bottom wall 37, a hinge 39 is fixed from which the lower section 40 of the chute or spout is supported. This lower section 40 comprises side walls 41 joined by a bottom wall 42 to which the hinge 39 is attached.

By virtue of the hinged joint between the two sections, it is possible to collapse the same upon each other as shown in Figure 4, thus reducing the overall height of the chute or spout so that it takes up a minimum of space beneath the truck body 6 when the same is in its lowered position as shown in Figure 3.

Before the truck body is lowered, the chute or spout must be moved to a position at which it is clear of all parts of the truck chassis. In the particular embodiment illustrated, the chute is moved to its foremost position with its discharge end pointed forward. This location affords the maximum space for the chute or spout and permits maximum lowering of the truck body. During the lowering of the truck body, the bottom section of the chute or spout strikes a suitable support 43 carried by the truck chassis which automatically folds up the chute as shown in Figure 4. Not only does the lowering of the truck body automatically collapse or fold up the two sections of the chute, but to afford additional space for the descent of the body, it also lifts the entire chute structure with respect to its supporting collar 23.

When the truck body is elevated and the chute is lifted from the support 43, the opening movement of the lower section 40 is limited by hooks 44 fixed to the side walls 41 of the lower section and engaging over the top edges of the side walls 36 of the upper section.

If desired, a closure 45 in the form of a swinging gate pivoted as at 46 to the side walls 41 of the lower section may be provided to close the mouth of the chute or spout. For opening the gate 45, a handle 47 is provided and to limit its closing movement a stop abutment 48 projects from the forward edge of the bottom wall 42 of the lower chute section.

The operation and manner of use of the truck body is believed clear from the drawings and the description thus far. It is desired, however, to particularly point out that when the body 6 is elevated, as shown in Figure 1, the entire chute or spout structure is readily positionable beneath the discharge port of any selected compartment and may be turned to discharge the contents thereof to either side of the truck.

From the foregoing description taken in connection with the accompanying drawings, it will be readily apparent to those skilled in the art, that this invention provides a truck body divided into compartments so as to be especially adapted to the delivery of coal, and so constructed that the contents of any compartment may be quickly and easily discharged without necessitating the heretofore objectionably high body construction, so that the center of gravity of the truck unit is low when the body is in its lowered position.

What I claim as my invention is:

1. In combination with an automobile truck having a chassis supported in part by rear wheels, a hopper body divided into a number of separate compartments, each of which has its own discharge port with sloping walls leading thereto, said discharge ports lying on the same horizontal plane, means mounting the body from the chassis for movement between an elevated unloading position and a lowered traveling position at which the discharge ports lie close to the chassis, a single discharge chute, and means mounting the discharge chute from the body for movement from a position hanging down into the chassis to positions of alignment with any of the discharge ports when the body is elevated.

2. In combination with a vehicle chassis and a truck body of the type adapted to be elevated from a lowered traveling position to a raised discharging position and having a plurality of discharge ports at its bottom, a discharge chute, means for movably supporting the discharge chute from the body for disposition under any selected port, said discharge chute comprising a cylindrical collar forming its upper end portion, an upper chute section connected to said cylindrical collar in a manner permitting free rotation about the collar and vertical telescoping of the upper chute section and said collar to reduce the overall height of the discharge chute, and a lower chute section hingedly connected to the upper chute section to enable further reduction in the overall vertical dimension of the chute, and means carried by the chassis adapted to engage the lower chute section upon lowering of the truck body to collapse the chute sections and telescope the upper chute section and said collar.

3. In combination with an automobile truck having a chassis supported in part by rear wheels, a hopper body divided into a number of separate compartments, each of which has its own discharge port with sloping walls leading thereto, said discharge ports lying substantially on the same horizontal plane, means mounting the body from the chassis for movement between an elevated unloading position and a lowered traveling position at which the discharge ports lie close to the chassis, a single discharge chute, and means mounting the discharge chute from the body including tracks carried by the body, said tracks being of such length and so positioned with respect to the location of the discharge ports and transverse elements of the chassis to enable movement of the discharge chute to a position clear of obstructing transverse elements of the chassis so as to enable complete lowering of the body onto the chassis without regard for special space provision for the discharge chute while enabling movement of the discharge chute into alignment with any selected port when the body is elevated.

MICHAEL V. GILSON.